July 2, 1929.　　N. J. SMITH　　1,719,246
FISHING REEL
Filed May 29, 1928
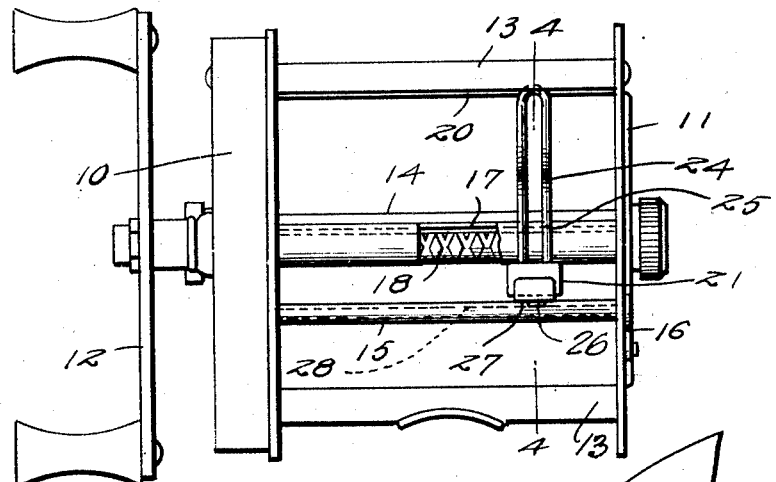
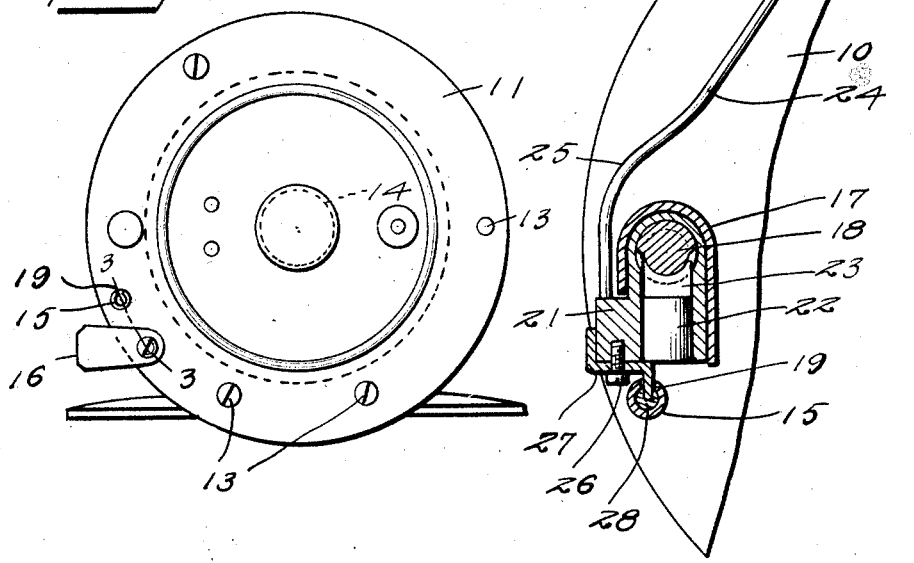
Inventor
N. J. Smith
By Kraco Chandler
Attorney Patented July 2, 1929.

1,719,246

UNITED STATES PATENT OFFICE.

NICHOLLS J. SMITH, OF BAINBRIDGE, GEORGIA.

FISHING REEL.

REISSUED

Application filed May 29, 1928. Serial No. 281,547.

This invention relates to new and useful improvements in reels and particularly to fishing line reels.

One object of the invention is to improve the construction of the line guide and carriage whereby the pawl, which engages with the threaded shaft, may be easily removed and replaced.

Another object is to provide a slide for guiding the carriage, which may be easily and quickly removed and replaced, whereby to facilitate the removal of the member which maintains the pawl in its proper place in the carriage.

Other objects and advantages will be apparent from the following description when taken in connection with the accompanying drawing.

In the drawing:

Figure 1 is an elevation of a reel made in accordance with the present invention.

Figure 2 is an end view.

Figure 3 is a longitudinal sectional detail view on the line 3—3 of Figure 2.

Figure 4 is a transverse sectional detail view, on the line 4—4 of Figure 1, enlarged.

Referring particularly to the accompanying drawing, 10 and 11 represent the end members of the reel, the former being in the form of a casing and containing the usual gearing, not shown, and supporting the operating crank 12, while the latter is in the form of a disk. Connecting the members 10 and 11 are the usual bracing and spacing rods 13, and in the center of the reel is the line drum 14.

In the inner face of the member 11 is seated one end of a tube 15, the other end of which is seated in an opening formed in the other end member 10. Pivotally mounted on the outer face of the member 10, and arranged to be swung into and out of covering relation to the said opening therein, and the adjacent end of the tube 15, is a cover plate 16. Upon swinging this plate to one side, whereby to uncover the end of the tube, said tube may be easily and quickly slipped therethrough. Disposed in parallel relation to the tube 15, and in close relation thereto, is a curved guard plate 17, the ends of which are properly secured in the end members 10 and 11. The curvature of this plate 17 is transversely thereof, and disposed within the said curvature, and having its ends journaled in the members 10 and 11, is a double spirally grooved shaft 18, said shaft being rotated by the aforesaid gearing in the casing of the end member 11. It will be noted that the tube 15 is located at one side of the plate 17, and is longitudinally slotted, as shown at 19. The spacing rod 13 located at the other side of the plate 17, is formed with a longitudinal groove 20. Disposed to slide longitudinally of the plate 17 is a block 21, forming the body of the line guide carriage. Disposed removably in the block is a cylindrical member 22, which has a rib 23 on its inner end for engagement in the grooves of the shaft 18, and by means of which said shaft causes the carriage to move back and forth, longitudinally of the shaft. Carried by the slidable carriage block 21 is a slotted tailpiece 24, the outer end of which rides in the groove 20 of the rod 13, whereby to maintain the carriage in proper position during its movements. This tail piece is curved inwardly, around the curved portion of the plate 17, as shown at 25, whereby to further assure the proper position of the carriage block. Secured to the outer wide face of the block 21, by means of the screw 26, is a plate 27, one end of which is bent to lie against the outer end face of the block, and secured to the outturned other end of the plate, is a transversely extending rod 28, which plays in the tube 15, while the portion of the plate attached to said rod plays in the slot of the tube, as the carriage block moves longitudinally of the grooved shaft 18. It will be noted that the rod carrying end of the plate 27 overlies the outer end of the cylindrical member 22, whereby to maintain said member properly seated within the opening of the block, and the ribbed end thereof in engagement with the grooves of the shaft 18. By removing the screw 26, after having withdrawn the tube 15, through the end member 10, and turning the reel so that the block 21 is inverted, the member 22 may be easily removed and a new member inserted. The parts can then be as easily restored to their places. This is very advantageous when the rib of the member 22 has become worn. It will thus be seen that the replacement of a worn member 22 is greatly facilitated, it being only necessary to remove the tube 15, and the screw 26.

What is claimed is:

1. The combination with a reel including end members and connecting rods, a line guide carriage drive shaft, a line guide carriage having a removable shaft engaging means, and means removably secured to the carriage for maintaining the engaging means in the carriage and engaged with said shaft.

2. The combination with a reel having a line guide carriage driving shaft, a carriage having a removable shaft engaging member, a guide member arranged in parallel relation to said shaft, and means removably secured to the carriage for retaining the shaft engaging member in proper position with respect to the carriage and shaft and being removably and slidably engaged with said guide member.

3. The combination with a reel having a line guide carriage drive shaft, a line guide carriage, a removable shaft engaging means in the carriage, a longitudinally slotted guide tube on the reel, a plate removably secured to the carriage in retaining relation to the shaft engaging means, and means on the plate slidably engaged in the slotted tube.

4. The combination with a reel having a line guide carriage drive shaft, a line guide carriage, a removable shaft engaging member disposed within the carriage, a plate removably secured to the carriage in retaining relation to the shaft engaging member, a longitudinally slotted tubular member carried by the reel, and a rod disposed transversely on said plate and slidable in said slotted tubular member.

In testimony whereof I affix my signature.

NICHOLLS J. SMITH.